May 11, 1926.
C. J. KOMASKA
1,584,037
COLLAPSIBLE VEHICLE TOP
Filed April 5, 1924
2 Sheets-Sheet 2
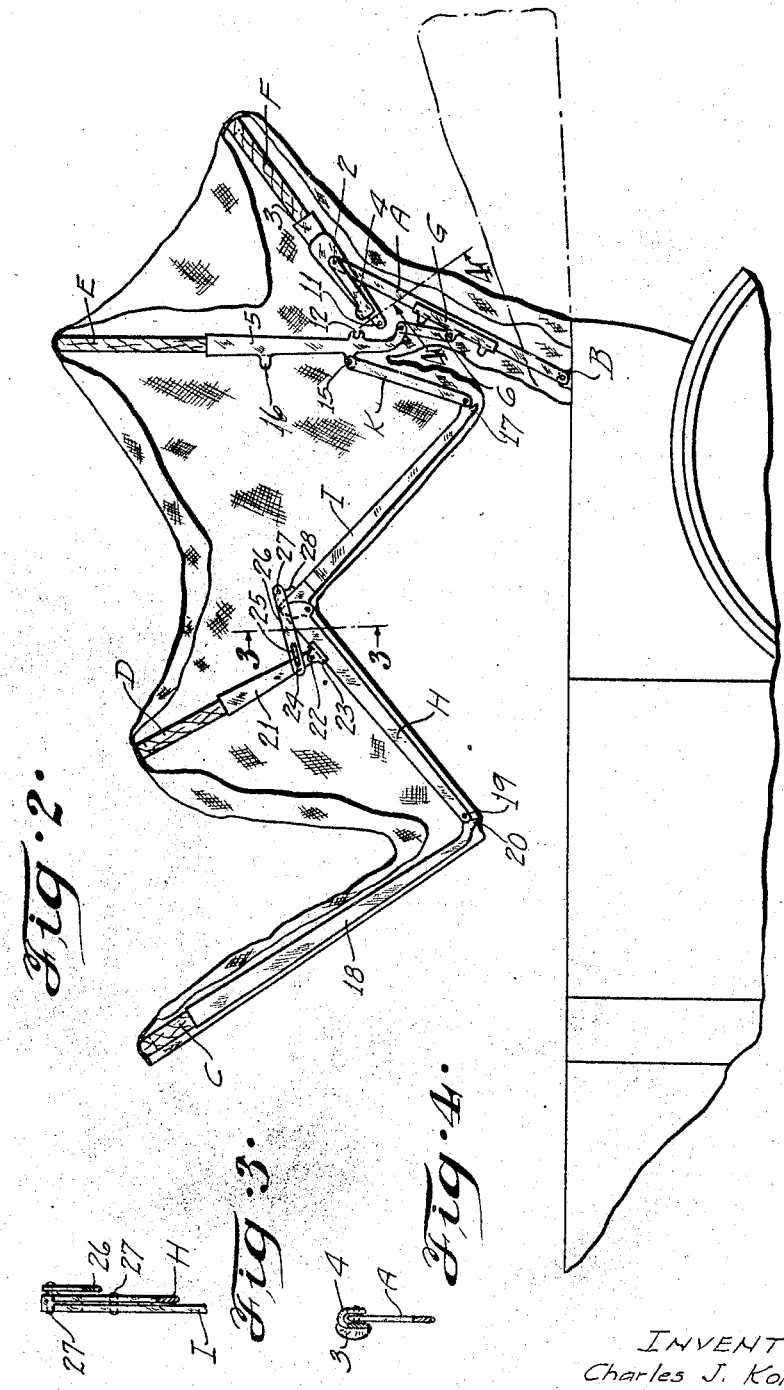
INVENTOR
Charles J. Komaska.
By Bakewell & Church
ATTORNEYS Patented May 11, 1926.

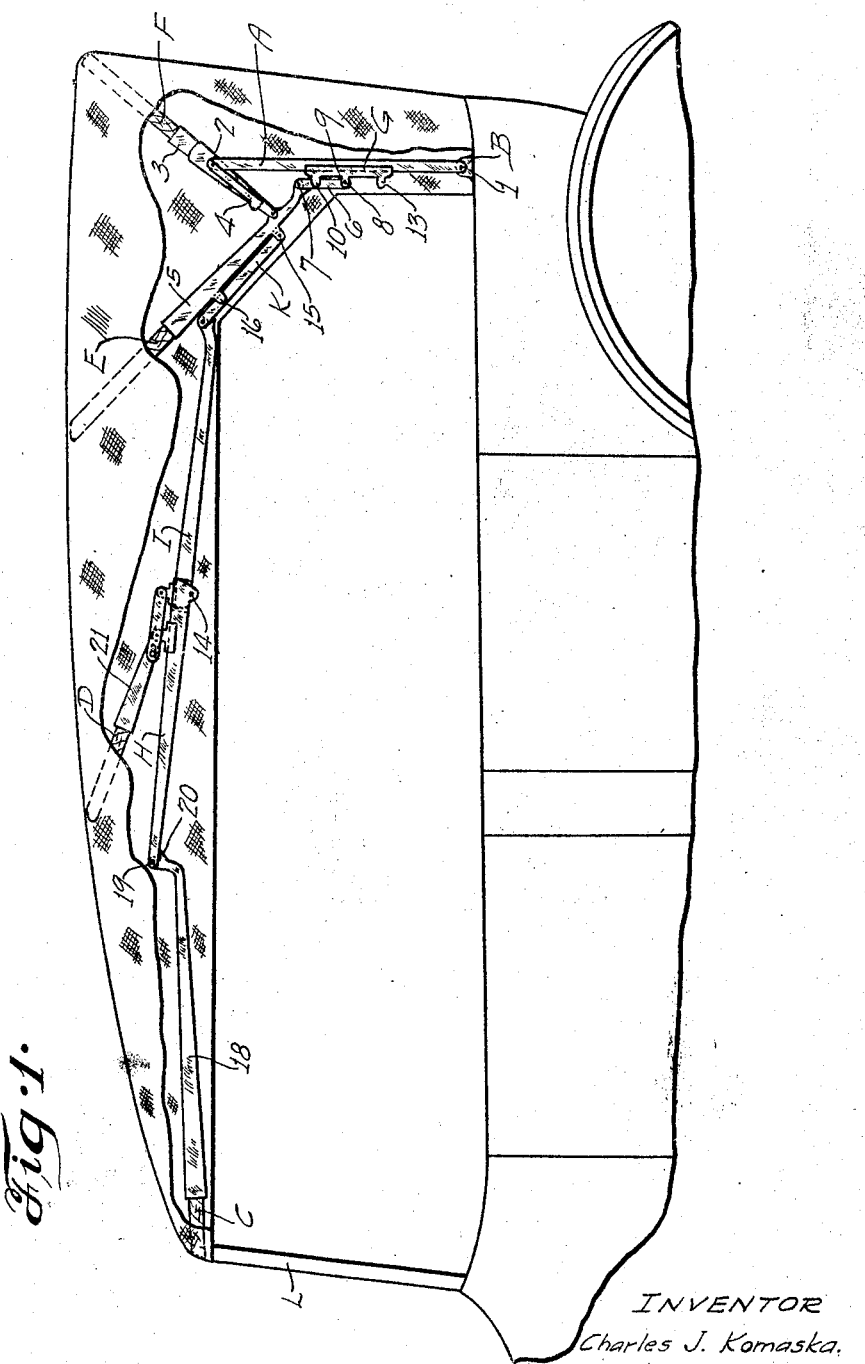

1,584,037

UNITED STATES PATENT OFFICE.

CHARLES J. KOMASKA, OF ST. LOUIS, MISSOURI.

COLLAPSIBLE VEHICLE TOP.

Application filed April 5, 1924. Serial No. 704,455.

This invention relates to collapsible tops of the kind that are used on automobile bodies of the open type, such, for example, as touring bodies, roadsters, run-a-bouts and sport model bodies.

One object of my invention is to provide a collapsible top for automobiles and other conveyances, which is constructed in such a manner that the supporting members of same are arranged within the marginal limits of the body, instead of on brackets that extend laterally from the body, thereby making it possible to build a top of substantially the width and outline as the body that can be collapsed and folded in a compact bundle when it is not in use.

Another object is to provide a collapsible top for automobiles and other conveyances in which the supporting members are arranged at such a point on the body that they will not obstruct the side view of the occupants or interfere with the upholstering at the sides of the rear seat of a touring body, or at the sides of the single seat of a roadster body. Other objects and desirable features of my invention will be hereinafter pointed out.

To this end I have devised a collapsible top of the so-called "one man" type that comprises two supporting members pivotally connected to brackets on the side walls of the body arranged within the marginal limits of the body, instead of to brackets that project laterally beyond the sides of the body, and a plurality of collapsible bows combined with said supporting members in such a way that said supporting members will be disposed vertically when the top is open and arranged at a point considerably to the rear of the point where the main supporting members of the conventional automobile top are located. By constructing the top in this manner I dispense with the two forwardly-inclined supporting members of the conventional collapsible top that obstuct the side view of the occupants and which have to be mounted on laterally-projecting side brackets on the body that deface the upholstering at the sides of the rear seat of a touring body and at the sides of the single seat of a roadster body; I make it possible to build a top that will conform to the shape and width of the body and I produce a collapsible top that takes up less space when folded than the conventional collapsible automobile top. I have herein illustrated my invention embodied in a four-bow top designed for use on an automobile body of the touring type, but I wish it to be understood that the particular number of bows with which the top is equipped is immaterial, and that my improved top is capable of use with various other conveyances than automobiles.

Figure 1 of the drawings is a side elevational view of my improved top, showing the top open.

Figure 2 is a side elevational view, illustrating the top partly collapsed; and

Figures 3 and 4 are sectional views, taken on the lines 3—3 and 4—4, respectively, of Figure 2.

Referring to the drawings which illustrate the preferred form of my invention, A designates two main supporting members (only one of which is shown) whose lower ends are pivotally connected at 1 to brackets B secured to the side walls of the body in close proximity to the back of the body. The particular point at which the brackets B are located may vary, but in a top for a touring car body said brackets will be arranged in sufficiently close proximity to the rear end of the body to prevent the supporting members A from obstructing the side view of the occupants of the rear seat, or interfering with the upholstering at the sides of said rear seat. In the conventional collapsible automobile top the main supporting members that correspond to the supporting members A of my top are mounted on brackets that project laterally from the sides of the body at a point quite close to the rear doors of the body. Accordingly, the top has to be made considerably wider than the body, thus producing a cumbersome top and prohibiting the use of side curtains that are arranged vertically in longitudinal alignment with the doors and the side walls of the body. In my improved top the main supporting members A are not arranged beyond or outside of the marginal limits of the body and at a point in front of the occupants of the rear seat, but on the contrary, said supporting members are arranged in vertical alignment with the side walls of the body and at a point to the rear of the line of vision of the occupants of the rear seat when said occupants are looking to the right or to the left.

The top herein shown is provided with a front bow C, a second bow D, a third bow E and a rear bow F, which bows are preferably constructed of wood and provided at their ends with metallic members commonly referred to as "bow sockets". The rear bow F, instead of being rigidly secured to the main supporting members A of the top, is pivotally mounted on said supporting members by pivots 2 that pivotally connect the upper ends of the supporting members A to the socket pieces 3 of the rear bow F, thereby enabling the rear bow F to be arranged at an angle to the supporting members A when the top is open, as shown in Figure 1, or in longitudinal alignment with said supporting members when the top is collapsed and folded. In order that the rear bow F will be held in rigid relation with the supporting members A when the top is folded, the socket pieces 3 of the rear bow are provided with substantially inverted U-shaped clips 4 that embrace the supporting members A when said members A are swung downwardly and rearwardly during the operation of folding the top. The third bow E is provided at its opposite ends with socket pieces 5 that are joined by links 6 to the supporting members A, each of said links being pivotally connected at one end by a pivot 7 to one of the socket pieces 5, and pivotally connected at its opposite end by a pivot 8 to a bifurcated lug 9 on a guide G secured to one of the supporting members A. When the top is open the links 6 project upwardly parallel to the supporting members A and are held in alignment with said supporting members by bifurcated jaws 10 on the guides G. At this time, namely, when the top is open, the socket pieces 3 of the rear bow F bear firmly against the socket members 5 of the third bow E, said socket pieces being retained in engagement with each other by laterally-projecting pins 11 on the socket pieces of the rear bow that fit in jaws 12 in the socket pieces 5 of the third bow E, as shown more clearly in Figure 2. In the operation of collapsing the top the socket pieces 3 of the rear bow are disengaged from the jaws 12 of the socket pieces of the third bow E, as shown in Figure 2, and the links 6 that join the third bow E to the supporting members A are then swung downwardly into engagement with bifurcated lugs 13 on the guides G, thereby changing the relative arrangement of the third bow and the rear bow so that said bows will align with each other when the top is completely collapsed.

Two jointed braces each of which is composed of two members H and I pivotally connected by a pivot 14, project forwardly from links K that are pivotally connected at 15 to the socket pieces 5 of the third bow E. When the top is open the links K extend parallel to the socket pieces 5, as shown in Figure 1, and are held in alignment with said socket pieces by bifurcated clips 16 on said socket pieces that embrace said links. The brace members H and I are connected together in such a manner that they can break only in one direction, namely, upwardly, and each of the brace members I is provided adjacent the point where it is connected to its co-operating link K with a stop 17 that bears against said link when the top is open, and thus tends to prevent the front end of the brace from swinging downwardly. The front bow C is provided with relatively long metal socket pieces 18 that are pivotally connected by pivots 19 to the front ends of the braces formed by the members H and I, and each of said socket pieces 18 is provided with a stop 20 which bears against its co-operating brace member H in such a way when the top is open that the front bow C is held in a certain position with relation to the two jointed braces that carry same.

The second bow D is provided at its opposite ends with metallic socket pieces 21 that are pivotally connected at 22 to brackets 23 on the brace members H. In order to guide the second bow D and hold it in a certain position with relation to the two bows between which it is arranged, the socket pieces 21 on the second bow D are provided with laterally-projecting pins 24 that enter elongated slots 25 in links 26 that are pivotally connected at 27 to brackets 28 on the brace members I. When the top is open, as shown in Figure 1, the pins 24 on the socket pieces of the second bow D bear against the ends of the slots in the links 26, thereby causing the second bow D to be held in a forwardly-inclined position, and when the jointed braces composed of the members H and I are broken, during the operation of folding the top, the elongated slots 25 in the links 26 permit the second bow D to be swung upwardly and rearwardly into parallel relationship with the front bow C and the third bow E, as shown in Figure 2.

A collapsible top of the construction above described takes up less space, when folded, than the conventional collapsible automobile top; it can be made to conform to the shape and width of the body, thus permitting the side curtains to be arranged in a truly vertical position, in vertical alignment with the sides and doors of the body, and there are no portions of the top that interfere with the vision of the occupants of the rear seat. The top is no more expensive to manufacture than the conventional folding automobile top; it can be opened and closed more quickly and easily than the collapsible tops now in general use, and it is exceptionally strong and rigid, owing to the fact that the various members constituting same are combined in such a way that the downward force exerted by the front bow C on the jointed side braces tend to hold the supporting members A in an upright position and the socket pieces 3 of the rear bow F pressed tightly against the socket pieces 5 of the third bow E, it being, of course, understood that when the top is open, the front bow of same is partly sustained by the wind shield L mounted on the cowl of the body.

Having thus described my invention, what I claim as new and desire to secure by Letters Patent is:

1. A collapsible top for automobiles and other conveyances, comprising a front bow, a rear bow provided with socket pieces, vertically-disposed supporting members arranged at a point to the rear of the line of vision of the occupants, permanent pivotal connections between said supporting members and the socket pieces of the rear bow, an intermediate bow provided with socket pieces that are joined to said supporting members by swinging links, co-operating means on the socket pieces of said rear bow and intermediate bow for detachably connecting said elements together and for assisting in holding the rear bow in a rearwardly-inclined position and disposed at an angle to said supporting members when the top is open, and forwardly-projecting jointed braces that sustain the front bow and which are connected by links to the socket pieces of the intermediate bow.

2. A collapsible top for automobiles and other conveyances, comprising a front bow, a rear bow provided with socket pieces, vertically-disposed supporting members arranged at a point to the rear of the line of vision of the occupants, pivotal connections between said supporting members and the socket pieces of the rear bow, an intermediate bow provided with socket pieces that are joined to said supporting members by swinging links, co-operating means on the socket pieces of said rear bow and intermediate bow for detachably connecting said elements together and for assisting in holding the rear bow in a rearwardly-inclined position when the top is open, forwardly-projecting jointed braces that sustain the front bow and which are connected by links to the socket pieces of the intermediate bow, a second intermediate bow pivotally mounted on the front members of said braces, and links pivotally connected to the rear members of said braces for controlling the position of said second intermediate bow.

3. A collapsible top for automobiles and other conveyances, comprising pivotally mounted supporting members arranged in close proximity to the back of the body and adapted to be disposed in a substantially vertical position when the top is open, a plurality of collapsible bows, pivotal connections between said supporting members and the rear bow, means for interlocking the rear bow with the adjacent bow in front of same when the top is open, swinging links on said supporting members pivotally connected to said adjacent bow, and jointed braces that carry the front bow, connected by links to said adjacent bow in such a way that the rear ends of said braces can be swung downwardly and forwardly with relation to said adjacent bow during the operation of folding the top.

4. A collapsible top for automobiles and other conveyances, comprising two main supporting members pivotally connected at their lower ends to brackets on the side walls of the body, an intermediate bow provided with socket pieces connected to said supporting members by links that are adapted to be swung upwardly during the operation of opening the top and downwardly during the operation of collapsing the top, a rear bow pivotally mounted on said supporting members and detachably connected to the socket pieces of said intermediate bow, swinging links on said socket pieces that extend parallel to same when the top is open, and jointed braces projecting forwardly from said intermediate bow and having their rear ends pivotally connected to the links on said socket pieces and their front ends pivotally connected to the front bow of the top.

5. A collapsible top for automobiles and other conveyances, comprising two main supporting members pivotally connected at their lower ends to brackets on the side walls of the body, an intermediate bow provided with socket pieces connected to said supporting members by links that are adapted to be swung upwardly during the operation of opening the top and downwardly during the operation of collapsing the top, a rear bow pivotally mounted on said supporting members and detachably connected to the socket pieces of said intermediate bow, swinging links on said socket pieces that extend parallel to same when the top is open, jointed braces projecting forwardly from said intermediate bow and having their rear ends pivotally connected to the links on said socket pieces and their front ends pivotally connected to the front bow of the top, a second intermediate bow pivotally mounted on the front members of said braces, and links pivotally connected to the rear members of said braces and joined by slot and pin connections to said second intermediate bow.

CHARLES J. KOMASKA.